United States Patent Office 3,448,236
Patented June 3, 1969

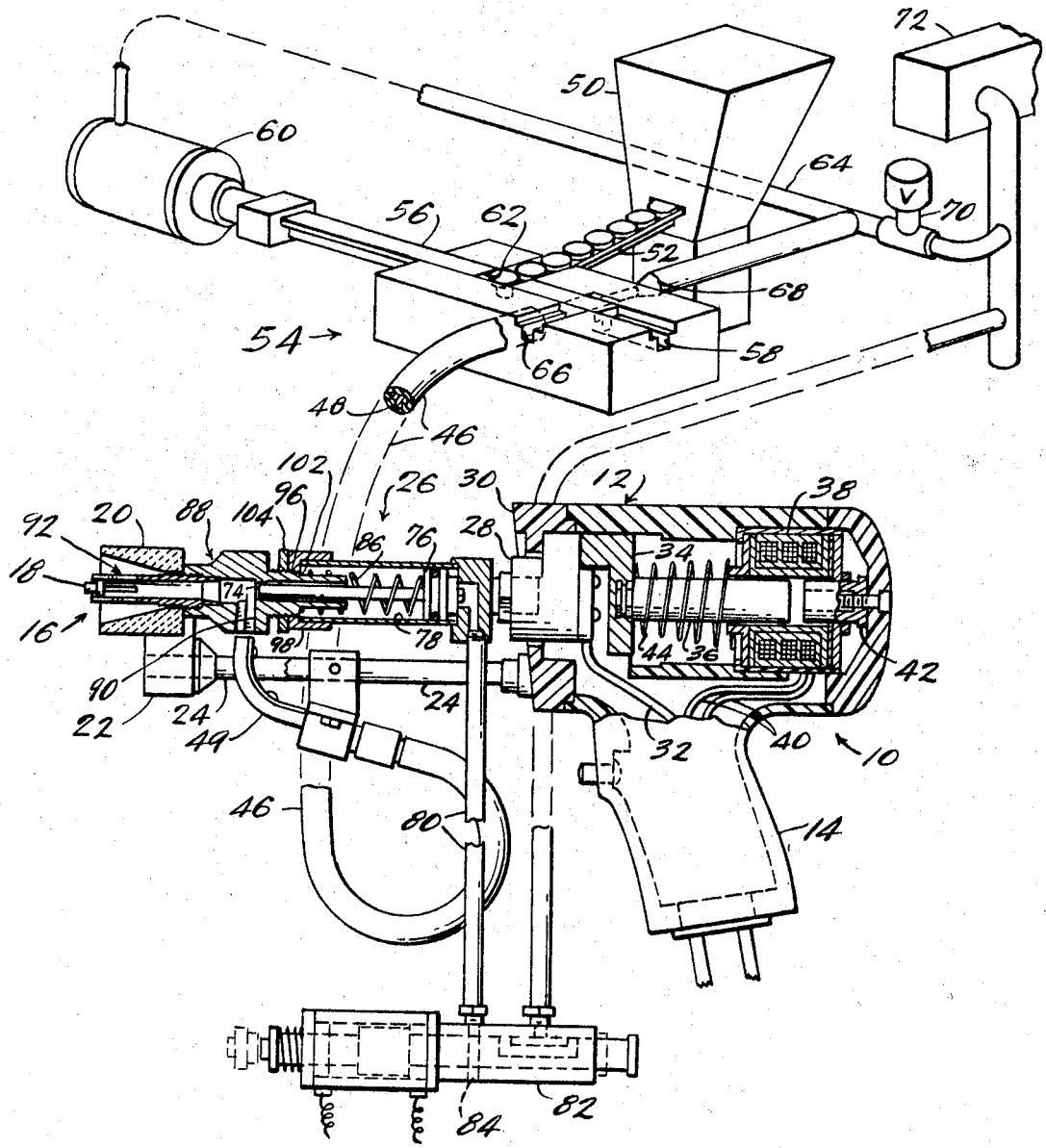
FIG-1-

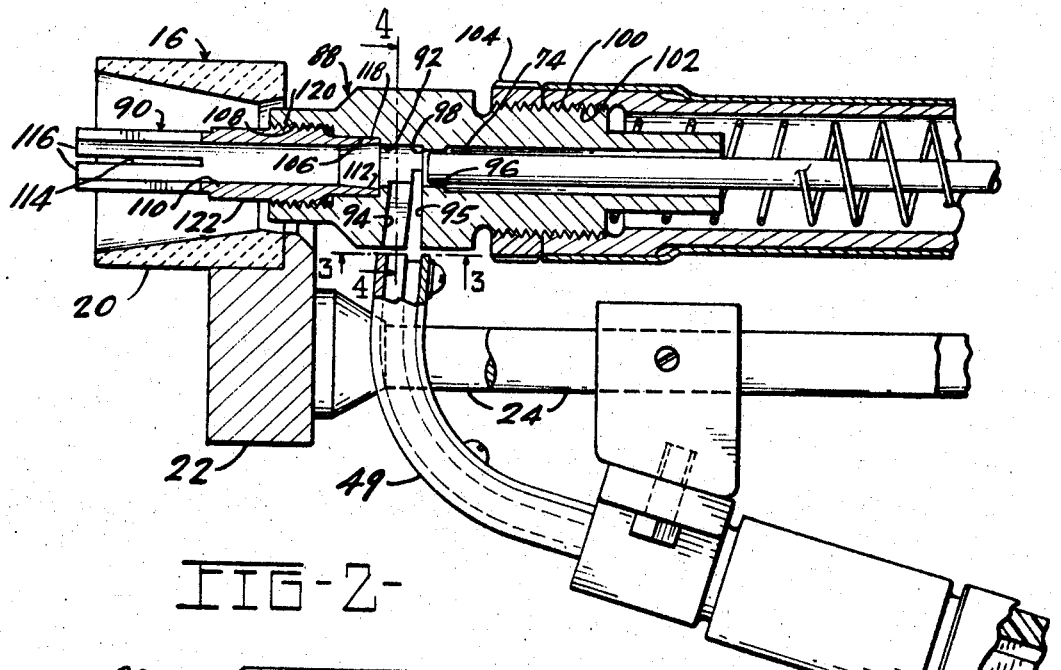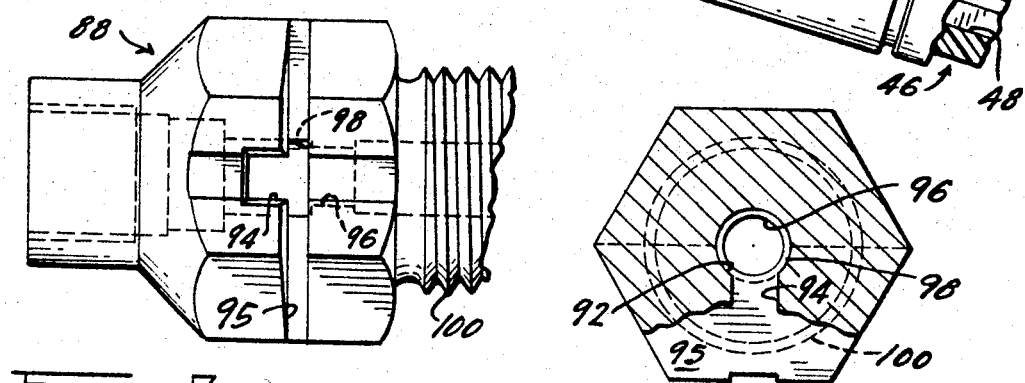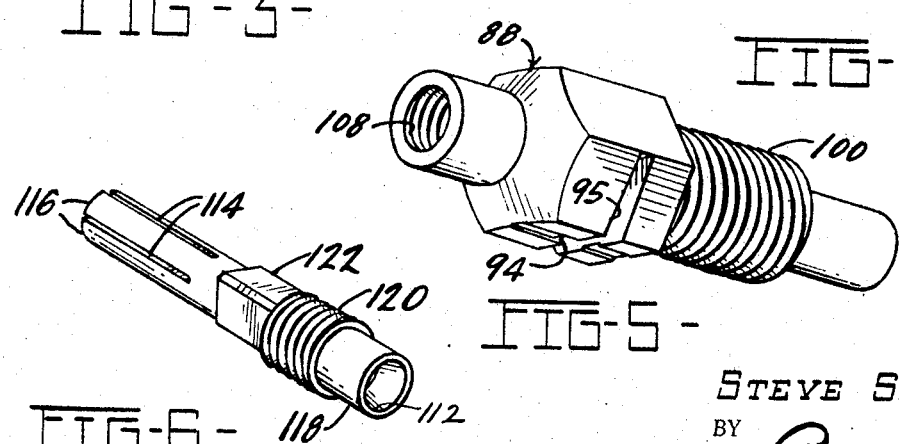

3,448,236
APPARATUS FOR FEEDING STUDS SEQUENTIALLY TO A WELDING TOOL
Steve Spisak, Elyria, Ohio, assignor to Gregory Industries, Inc., Lorain, Ohio, a corporation of Michigan
Filed Jan. 18, 1965, Ser. No. 426,274
Int. Cl. B23k *11/04;* B65g *59/04, 11/20*
U.S. Cl. 219—98     2 Claims This invention relates to stud welding apparatus and more particularly to a chuck assembly for receiving a stud and for positioning and for holding a stud during a welding operation.

Stud welding tools for end welding various types of studs to workpieces are being used in more and more applications. In particular, small studs are now used frequently to fasten objects to workpieces. Loading the small studs in the welding tool chucks is time consuming and may be much longer than the actual welding of the stud to the workpiece. Consequently, automatic loading means for the studs has been developed with such apparatus being shown, for example, in my co-pending application, Ser. No. 358,736. Loading means of this nature has greatly decreased the time requirement for the loading step of the overall operation and has greatly increased the number of studs capable of being welded in a given period of time.

The present invention relates to a chuck assembly for receiving a stud and for positioning and holding a stud fed automatically to a welding tool. The chuck assembly includes a loading or stud-receiving body having a loading passage or chamber through which a plunger extends for moving the stud through a central passage in a chuck to a welding position at an end thereof. The loading body also has a transverse stud inlet communicating with the loading passage and shaped to receive a stud sideways. More specifically, the loading body has an annular shoulder in the loading chamber immediately behind the stud inlet to serve as a positive stop for the stud when supplied through the inlet to the loading chamber. This shoulder prevents rearward movement of the stud in the chamber and holds the stud in a fixed position just in front of the plunger. The shoulder has been found to be instrumental in substantially eliminating coking or jamming of the studs in the loading chamber or in the chuck passage. While jamming of the studs has heretofore occurred in only a small percentage of loading operations, nevertheless this has been a problem since clearing the passages after a stud has jammed is time consuming. The shoulder has substantially eliminated such jamming or cocking.

The central passage of the chuck constituting part of the chuck assembly extends completely therethrough and communicates with the loading passage or chamber of the loading body. The chuck also includes means for making a connection with the loading body and specifically includes a threaded portion for accomplishing this. To the rear of the threaded portion is an annular projecting portion which extends into the end of the loading body to align the loading chamber with the chuck passage. On the chuck beyond the threaded portion is a non-circular portion adapted to receive a wrench or similar tool for assembling the chuck with the loading body. The chuck terminates in four longitudinally-extending, resilient fingers which frictionally engage the head of the stud to help maintain it in position during the welding operation.

It is, therefore, a principal object of the invention to provide an improved stud chuck assembly for an automatically-loaded stud welding tool.

Another object of the invention is to provide a chuck for a chuck assembly, which chuck has a central passage extending entirely therethrough for receiving a stud rearwardly thereof and which also has means for making a connection with a loading body.

A further object of the invention is to provide a loading body for a stud chuck assembly, said body having a shoulder in a loading chamber or passage thereof to position studs therein and substantially eliminating jamming thereof.

Other objects and advantages of the invention will be apparent from the following detailed description of a preferred embodiment thereof, reference being made to the accompanying drawing, in which:

FIG. 1 is a somewhat schematic view, partly in perspective and partly in vertical cross section, of a stud welding tool according to the invention and loading means therefor;

FIG. 2 is an enlarged, fragmentary view in vertical, longitudinal cross section of a welding tool chuck assembly and adjacent components shown in FIG. 1;

FIG. 3 is a detailed view in cross section taken generally along the line 3—3 of FIG. 2;

FIG. 4 is a view in transverse cross section taken along the line 4—4 of FIG. 2;

FIG. 5 is a view in perspective of a loading body of the chuck assembly shown in FIG. 2; and FIG. 6 is a view in perspective of the chuck of the assembly shown in FIG. 2.

Referring particularly to FIG. 1, a stud welding tool 10 is used to end weld studs to a workpiece in a known manner. The studs preferably are arc welded by the technique disclosed in Nelson Patent 2,191,494 or in Glorioso Patent 3,136,880. However, the studs also can be welded by the technique disclosed in Graham Patent 2,610,278, for example, or by resistance welding.

The stud welding tool 10 includes a main housing 12 of dielectric material having an integral hand grip 14. A chuck assembly 16 is located at the front of the tool 10 and receives, positions, and holds a stud 18 during the welding operation. The chuck assembly 16 is surrounded by a suitbale spark shield 20 attached to a welding foot 22 which is adjustably held by two supporting legs 24, as is known in the art.

The chuck assembly 16 is attached to a chuck leg 26 which is electrically connected to a cable clamp 28. The clamp 28 is slidably supported in a forward portion of the body 12 which is closed off by a front end wall 30. Welding current is supplied to the stud 18 through a main flexible welding cable 32, through the clamp 28, the chuck leg 26, and through the chuck assembly 16.

To the rear of the cable clamp 28 is a rear cable clamp part 34 connected to a solenoid core 36 extending rearwardly into a lifting and holding coil 38. The core 36 is retracted when current is supplied to the coil 38 through suitable leads 40. The rearward movement of the core 36, which determines the extent of the lift of the chuck 16 and the stud 18, is limited by an adjustable core piece 42. A return or plunge spring 44 returns the stud to the workpiece when the current to the coil 38 is shut off. If the stud length varies excessively from stud to stud, it may be necessary to employ a clutch arrangement to enable constant lift to be obtained, as has heretofore been known and used.

The overall loading apparatus which automatically supplies a new stud to the chuck assembly 16 will now be discussed. The studs 18 are fed one at a time to the chuck assembly 16 by suitable feed means which, in this instance, includes a flexible feed tube 46. The feed tube 46 has a feed passage 48 which has a cross-sectional shape similar to the cross-sectional shape of the studs 18 so the studs can move sideways down the tube and through a fixed supply tube 49. The studs to be fed through the tube 46 can be supplied from a hopper 50 and fed down an inclined track 52 to an escapement mechanism 54. The escapement 54 includes a carrier 56 which is slidably reciprocated in a track or slot 58 by a fluid-operated ram 60. The carrier 56 has a notch 62 which receives one stud at a time from the track 52 when at one end of its path or stroke. When air is supplied to the ram 60 through a line 64, the carrier is moved to the opposite end of the path, in which position the notch 62 and the stud 18 therein are aligned with an air supply groove 66. When the air is shut off, the carrier 56 returns to the first position, biased by a spring (not shown) where it receives another one of the studs 18.

In the second position of the carrier 56, the studs are blown from the notch 62 by air supplied through a nozzle 68 with the stud thereby moved down the passage 48 to the chuck assembly 16. The air for both the nozzle and the ram can be controlled by a solenoid-operated valve 70, the air being supplied from a suitable source 72.

When the stud reaches the chuck assembly 16 through the passage 48, it is moved forwardly to the welding position by means of a plunger 74. The plunger 74, in this instance, is pneumatically driven by means of a piston 76 which reciprocates in an air cylinder 78. Air is supplied to the rear of the cylinder 78 through an air supply line 80 and is controlled by a solenoid-operated valve 82. The valve 82 supplies air to the cylinder 78 when in the normal or inactive position; and the valve vents the cylinder 78 through a valve vent 84 when the valve 82 is energized, as in the position shown. When the cylinder 78 is vented, the plunger 74 is moved to its rearward or retracted position by a return spring 86. Oppositely, when the valve 82 is de-energized, air is admitted to the rear of the cylinder 78 and the piston 76 as well as the plunger 74 are moved forwardly. As the plunger 74 is moving toward its rearward position, one of the studs 18 can be supplied to the chuck assembly 16. The stud then contacts the side of the plunger and stops until the plunger approaches the end of the retracting stroke. The stud then drops into the chuck assembly without bouncing as would otherwise occur. When the plunger is in its forward position, the stud is held at the front of the chuck assembly in welding position, with the plunger backing up the stud during the welding operation.

Referring now in more detail to the chuck assembly 16, it includes a stud-receiving or loading body 88 and a chuck 90 attached thereto. As shown in FIGS. 2-4, the body 88 has a central stud-receiving chamber or passage 92 which, in this instance, is circular in cross section and has a diameter slightly larger than the diameter of the head of the stud 18. The body 88 also has a transverse inlet 94 communicating with the chamber 92 and having a transverse cross-sectional shape similar to the longitudinal cross-sectional shape of the stud 18. In this manner, a stud can only be conveyed through the inlet 94 so that the stud must be properly oriented when received in the chamber 92. The shape of the inlet is the same as the shape of the passage 48 so that the studs retain their sideways orientation all the way from the carrier 56 to the chamber 92. A slot 95 is cut across the inlet 94 to facilitate the escape of air from the passage 48 as the stud moves through.

When the stud reaches the chamber 92, it is moved forwardly almost immediately by the plunger 74. The plunger 74 is smaller in diameter than the stud and the chamber 92 and is guided by an inwardly extending ring 96 forming a shoulder or stop 98 immediately behind the inlet 94. The shoulder 98 substantially prevents or limits rearward movement of the stud after reaching the chamber 92.

Heretofore, the studs 18 occasionally have become cocked in the chamber 92 or in the chuck 90. This has resulted in a serious delay in operations, particularly if the chuck must be dis-assembled or otherwise manipulated to remove the jammed stud. It has been discovered, however, that this jamming can be substantially eliminated by providing the shoulder 98 at the rear of the inlet 94. When the stud is blown into the chamber 92, it cannot move rearwardly past the shoulder 98. Consequently, it usually is blown forwardly into the rear portion of the chuck 90 from which it is moved into welding position by the plunger 74. With this arrangement, the stud cannot jam near the inlet 94 when moved forwardly by the plunger. It has been found that if the stud and air are fed perpendicularly to the body 88, the stud will not always be moved forwardly toward the chuck 90 by the air. By including the supply tube 49 at an angle of 2-8° and preferably 4-6° to the perpendicular, apparently turbulence is produced in the air to assure that the air will move the stud forwardly. By slanting the tube 49 rearwardly, as shown, the stud moves through the inlet 94 more smoothly than when the tube is slanted forwardly, although either direction of inclination is satisfactory insofar as the stud movement caused by the air is concerned.

Without the shoulder 98, the studs would tend to be blown rearwardly upon entering the chamber 92 until in contact with the plunger 74. If the plunger were too far to the rear of the inlet 94, when in the retracted position, the studs would occasionally become cocked and subsequently jam at the inlet when moved forwardly.

A rearward portion of the stud-receiving body 88 has a threaded shank 100 which is threadedly received in a recess 102 at the end of the cylinder 26. The body 88 is threaded into the recess 102 until properly oriented with the tube 46, at which time a lock nut 104 is turned against the end of the cylinder 26 to hold the body 88 in place. At a forward portion of the body 88 is an annular recess 106 in front of the chamber 92, and a threaded recess 108 in front of that to receive the chuck 90.

The chuck 90 has a central longitudinal passage 110 with a slightly tapered end 112 communicating with the loading chamber 92. The taper assures that no shoulders will be formed, facing rearwardly, between the chamber 92 and the passage 110 which could catch and stop or cock a stud being pushed forwardly. The forward end of the chuck 90 has four slots 114 dividing the end into four resilient fingers 116, which extend approximately half the length of the chuck 90. The fingers 116 provide a frictional engagement for the head of the stud 18 to aid in maintaining it in the welding position when shoved forwardly by the plunger 74.

The chuck 90 has an annular projection 118 which extends into the recess 106 to aid in orienting the central passage 110 with the chamber 92, and has a threaded portion 120 immediately in front of the projection 118 to connect the chuck 90 to the body 88, and specifically to the recess 108 thereof. Just forwardly of the threaded portion 120 is a non-circular portion 122 which preferably is of generally rectangular shape so that the chuck 90 can be turned and tightened relative to the body 88. Any suitable wrench can be used for this purpose.

From the above, it will be seen that the chuck 90 can be relatively easily replaced without disturbing the body 88 simply by engaging the chuck with a wrench to unscrew it from the body 88. In this manner, the chuck can be replaced in a minimum amount of time which is important because the finger ends thereof are occasionally burned and subsequently become unuseable. While this may not happen often, if the tool 10 is used substantially continually throughout the day, the chuck may require replacement several times during the day.

The stud body 88 also must be replaced occasionally simply due to wear caused by the studs being blown into the loading chamber 92. It is also relatively easily accomplished by loosening the lock nut 104 and unscrewing the body from the cylinder 78. It may be noted that the chuck 90 requires no special peripheral orientation relative to the stud-receiving body 88.

While the operation of the tool 10 and the loading apparatus will be apparent from the above discussion, it will be reviewed briefly. When one of the studs 18 is held in the welding position by the fingers 116 and backed up by the plunger 74, the stem of the stud 18 will be placed in contact with the workpiece. When the welding cycle is then commenced, the chuck 90 and the stud 18 will be retracted, along with the plunger 74 and the cylinder 78, as a unit, with a pilot arc then established between the stud and the workpiece. A heavy welding arc will subsequently be established across the stud and workpiece while the stud is in the retracted position. The stud is then plunged against the workpiece, preferably with the welding current being shut off at about the time the stud contacts the workpiece, to complete the weld. The tool 10 is then removed from the workpiece with the fingers 116 pulled off the head of the stud.

The valve 70 is then opened to supply air to the ram 60 and cause the carrier 56 to move to its second position, carrying one of the studs 18 in the notch 62 which was received from the track 52. When the carrier reaches its second position, air will already have been supplied to the nozzle 68 and, at this time, the stud in the notch 62 will be blown down the passage 46 and into the stud chamber 92 against the shoulder 98. While this air is still being supplied through the passage 46, the valve 82 will be de-energized to supply air to the cylinder 26 and cause the piston 76 to move the plunger 74 forwardly, thereby moving the stud to the welding position. The plunger then remains in that position until the welding cycle is completed.

Various modifications of the above described embodiment of the invention will be apparent to those skilled in the art, and it is to be understood that such modifications can be made without departing from the scope of the invention, if they are within the spirit and the tenor of the accompanying claims.

I claim:

1. A stud welding tool having a plunger, means for reciprocating said plunger, a loading body having a loading chamber for receiving studs, said body being connected to said tool with said chamber being aligned with said plunger and located in the path thereof, said body having a transverse inlet in the shape of the studs and said chamber having an inwardly extending projection immediately behind said inlet to prevent rearward movement of studs in said chamber, said projection being forward of said piston when in a retracted position, said loading chamber having a longitudinal axis lying in a plane which also extends centrally through said inlet, and means for feeding studs to said chamber one at a time including a supply tube communicating with said transverse inlet, said supply tube being located in said plane and directed rearwardly toward said projection at an angle of 2–8° to a line perpendicular to the axis of said chamber.

2. A stud welding tool having a plunger, means connected to said plunger for reciprocating said plunger between a forward, welding position and a rearward, loading position, a chuck assembly having a central longitudinal passage, gripping fingers at one end of said assembly, means for connecting the other end of said assembly with said reciprocating means, said assembly also having an inlet opening disposed transversely of said passage and communicating with said passage, said inlet opening having a shape which includes a stem portion and a head portion similar to the longitudinal cross-sectional shape of a headed stud having a stem portion and a head portion, said longitudinal passage from said inlet opening to the finger end of the chuck sssembly being slightly larger than the head of the stud, said chuck assembly having a shoulder extending perpendicularly to said longitudinal passage and positioned to prevent the stud from moving rearwardly of said inlet opening in said passage and to aid in maintaining the head of the stud perpendicular to said longitudinal passage with the stem parallel to said longitudinal passage after entering said inlet opening, said shoulder establishing a fixed dimension across said longitudinal passage which is smaller than the corresponding dimension across the head of the stud but larger than the corresponding dimension across said plunger to enable said plunger to move past said shoulder and to move the stud toward said gripping fingers, said plunger being rearwardly of said shoulder when in the loading position, and means for blowing studs one at a time from a remote position through said inlet opening and into said loading passage.

References Cited

UNITED STATES PATENTS

| 2,110,832 | 3/1938 | Hogg et al. | 219—98 |
| 2,537,989 | 1/1951 | Graham | 219—78 |
| 2,640,133 | 5/1953 | Ainsworth | 219—98 |
| 2,905,803 | 9/1959 | Brady | 219—79 |

FOREIGN PATENTS

| 806,526 | 12/1958 | Great Britain. |
| 931,557 | 8/1955 | Germany. |

RICHARD M. WOOD, *Primary Examiner.*

R. F. STAUBLY, *Assistant Examiner.*

U.S. Cl. X.R.

193—43; 198—50; 221—278, 312